US011056911B2

(12) United States Patent
Kakuda (10) Patent No.: US 11,056,911 B2
(45) Date of Patent: Jul. 6, 2021

(54) MANAGEMENT SYSTEM, MANAGEMENT METHOD, EQUIPMENT, AND MANAGEMENT DEVICE

(71) Applicant: KYOCERA CORPORATION, Kyoto (JP)

(72) Inventor: Yuji Kakuda, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 350 days.

(21) Appl. No.: 16/089,581

(22) PCT Filed: Mar. 28, 2017

(86) PCT No.: PCT/JP2017/012503
§ 371 (c)(1),
(2) Date: Sep. 28, 2018

(87) PCT Pub. No.: WO2017/170464
PCT Pub. Date: Oct. 5, 2017

(65) Prior Publication Data
US 2020/0287408 A1    Sep. 10, 2020

(30) Foreign Application Priority Data

Mar. 29, 2016   (JP) .............................. JP2016-066750

(51) Int. Cl.
*H02J 13/00* (2006.01)
*H02J 3/14* (2006.01)
*H02J 3/32* (2006.01)

(52) U.S. Cl.
CPC .......... *H02J 13/00006* (2020.01); *H02J 3/14* (2013.01); *H02J 3/32* (2013.01); *H02J 13/00004* (2020.01);
(Continued)

(58) Field of Classification Search
CPC .......... H02J 13/00006; H02J 13/00004; H02J 13/00034; H02J 3/14; H02J 3/32;
(Continued)

(56) References Cited

U.S. PATENT DOCUMENTS

2007/0271006 A1* 11/2007 Golden ............... H02J 13/0075
700/295
2012/0065805 A1* 3/2012 Montalvo .............. G06Q 50/06
700/297
(Continued)

FOREIGN PATENT DOCUMENTS

EP        2966746 A1    1/2016
JP     2010-128810 A    6/2010
(Continued)

*Primary Examiner* — Ziaul Karim
(74) *Attorney, Agent, or Firm* — Hauptman Ham, LLP (57) ABSTRACT

A management system includes an equipment and a management device. The management device includes a transmitter that transmits a first command to the equipment to instruct an operation of the equipment. The equipment includes a controller that controls an operation of the equipment according to the first command, and a transmitter that transmits a response command containing a property indicating a state of the equipment to the management device. A property of the first command includes a variable property indicating a variable that can be changed by an operation of the equipment. The controller keeps a variable indicated by the variable property without any change when the operation instructed by the first command is kept continuous. The transmitter provided in the equipment transmits the response command containing a specific value as the variable property to specify whether the operation is performed according to the first command.

15 Claims, 9 Drawing Sheets

(52) U.S. Cl.
CPC ..... *H02J 13/00034* (2020.01); *H02J 2310/12* (2020.01)

(58) Field of Classification Search
CPC ...... H02J 2310/12; H02J 13/0006; H02J 7/35; Y02E 60/00; H04M 11/00; H04Q 9/00
See application file for complete search history.

(56) References Cited

U.S. PATENT DOCUMENTS

| | | | |
|---|---|---|---|
| 2012/0330469 A1* | 12/2012 | Kinugasa .......... | H02J 13/00004 700/286 |
| 2013/0113284 A1* | 5/2013 | Altonen ............... | H05B 47/105 307/31 |
| 2013/0187466 A1 | 7/2013 | Sakai et al. | |
| 2014/0277788 A1* | 9/2014 | Forbes, Jr. ............. | G06Q 50/06 700/286 |
| 2015/0276253 A1* | 10/2015 | Montalvo ............... | H04L 12/12 700/276 |
| 2017/0180150 A1* | 6/2017 | Sato ........................ | G08C 17/02 |
| 2018/0313563 A1* | 11/2018 | Turney .................... | F25B 27/00 |
| 2018/0322405 A1* | 11/2018 | Fadell .................. | G08B 27/003 |

FOREIGN PATENT DOCUMENTS

| | | |
|---|---|---|
| JP | 5583781 B2 | 9/2014 |
| JP | 5857247 B2 | 2/2016 |
| WO | 2015/115571 A1 | 8/2015 |

\* cited by examiner

MANAGEMENT SYSTEM, MANAGEMENT METHOD, EQUIPMENT, AND MANAGEMENT DEVICE

RELATED APPLICATIONS

The present application is a National Phase of International Application No. PCT/JP2017/012503, filed Mar. 28, 2017, and claims priority of Japanese Patent Application No. 2016-066750, filed on Mar. 29, 2016.

TECHNICAL FIELD

The invention relates to a management system, a management method, an equipment, and a management device.

BACKGROUND ART

In recent years, there is provided a management system that includes an equipment and a management device that manages the equipment (for example. Patent Literature 1). The equipment is an electrical appliance such as an air conditioner and a lighting device, and a distributed power source such as a solar cell, a storage battery, and a fuel power generation device. The management device is called, for example, Home Energy Management System (HEMS), Store Energy Management System (SEMS), Building Energy Management System (BEMS), Factory Energy Management System (FEMS), and Cluster/Community Energy Management System (CEMS).

In order to popularize the management system, the communication standardization between the equipment and the management device is effective, and an attempt to standardize the communication is being made.

CITATION LIST

Patent Literature

Patent Literature 1: JP 2010-128810 A

SUMMARY OF INVENTION

A management system includes an equipment and a management device. The management device includes a transmitter configured to transmit a first command to the equipment to instruct an operation of the equipment. The equipment includes a controller configured to control an operation of the equipment according to the first command, and a transmitter configured to transmit a response command containing a property indicating a state of the equipment to the management device. A property of the first command includes a variable property indicating a variable that can be changed by an operation of the equipment. The controller keeps a variable indicated by the variable property without any change when the operation instructed by the first command is kept continuous. The transmitter provided in the equipment transmits the response command containing a specific value as the variable property to specify whether the operation is performed according to the first command.

A management method includes Step A of transmitting a first command from a management device to an equipment to instruct an operation of the equipment, Step B of controlling the operation of the equipment according to the first command by the equipment, and Step C of transmitting a response command from the equipment to the management device, the response command containing a property that indicates a state of the equipment. A property of the first command includes a variable property indicating a variable that can be changed by an operation of the equipment. Step B includes a step of keeping a variable indicated by the variable property without any change when the operation instructed by the first command is kept continuous. Step C includes a step of transmitting the response command containing, as the variable property, a specific value to specify whether the operation is performed according to the first command.

An equipment is managed by a management device. The equipment includes a controller configured to control an operation of the equipment according to a first command that is received from the management device, and a transmitter configured to transmit a response command containing a property indicating a state of the equipment to the management device. A property of the first command includes a variable property indicating a variable that can be changed by an operation of the equipment. The controller keeps a variable indicated by the variable property without any change when the operation instructed by the first command is kept continuous. The transmitter provided in the equipment transmits the response command containing a specific value as the variable property to specify whether the operation is performed according to the first command.

A management device manages an equipment. The management device includes a transmitter configured to transmit a first command to the equipment to instruct an operation of the equipment, and a receiver configured to receive a response command containing a property indicating a state of the equipment from the equipment. A property of the first command includes a variable property indicating a variable that can be changed by an operation of the equipment. The variable indicated by the variable property is kept without any change when the operation instructed by the first command is kept continuous. The receiver receives the response command containing a specific value as the variable property to specify whether the operation is performed according to the first command.

DESCRIPTION OF EMBODIMENTS

Hereinafter, embodiments will be described with reference to the drawings. In the following description of the drawings, the portions identical with or similar to each other will be attached with the same or similar symbol.

However, the drawings are schematically illustrated, and a ratio of each dimension may be different from the actual ratio. Therefore, specific dimensions should be determined with reference to the following description. Even in the drawings, there are included portion having a different relation of dimensions and a different ratio.

Embodiments (Management System)

Figure 1:
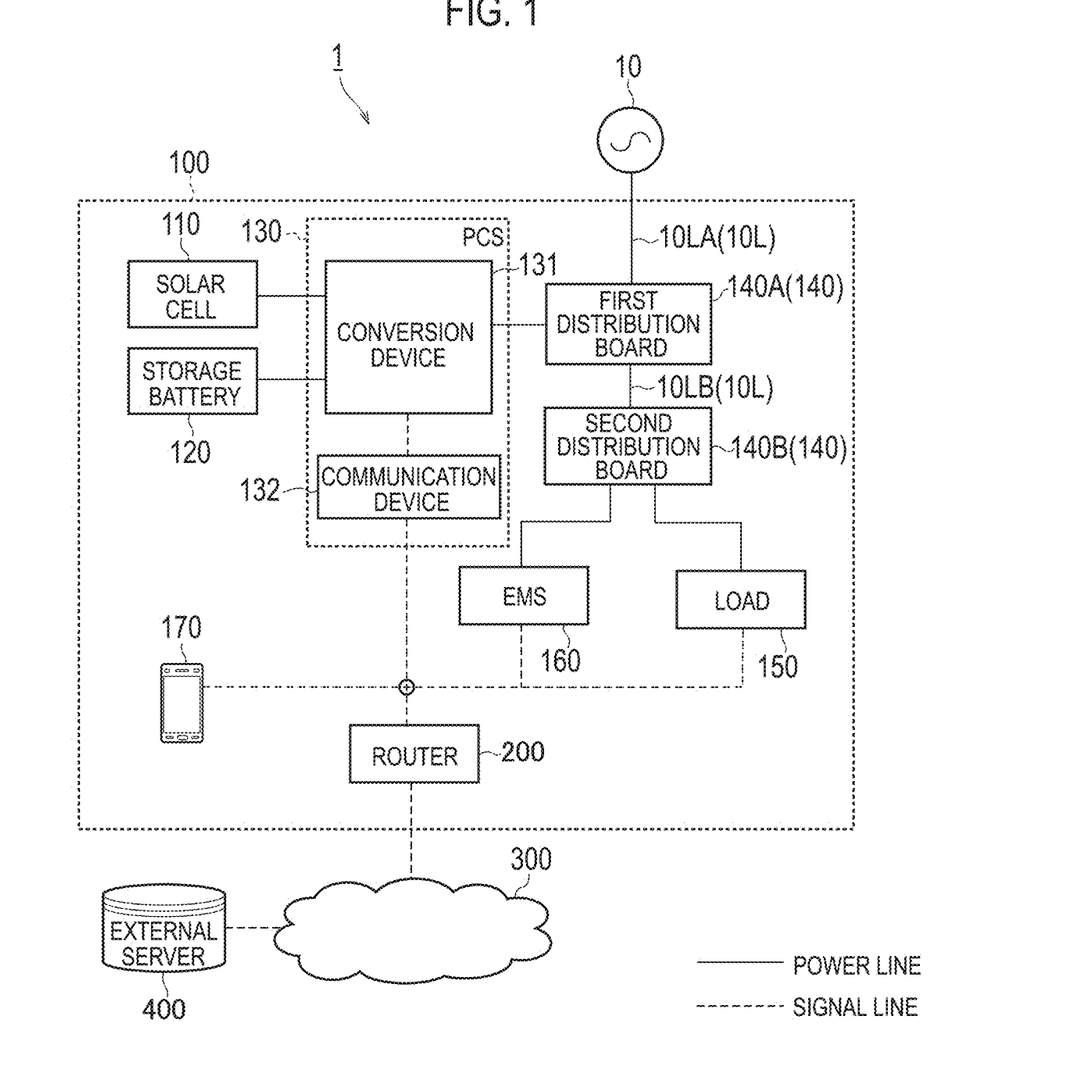
FIG. 1 is a diagram illustrating a management system 1 according to an embodiment.

In the following, a management system according to the embodiment will be described. As illustrated in FIG. 1, a management system 1 includes a facility 100 and an external server 400. The facility 100 includes a router 200. The router 200 is connected to the external server 400 through a network 300. The router 200 forms a local area network, and is connected to the respective devices (for example, a communication device 132 of a PCS 130, a load 150, an EMS 160, a display device 170, etc.). In FIG. 1, the solid line represents a power line, and the dotted line represents a signal line. Further, the invention is not limited to the above configuration, and the power line may transmit a signal.

The facility 100 includes a solar cell 110, a storage battery 120, the PCS 130, a distribution board 140, the load 150, the EMS 160, and the display device 170.

The solar cell 110 is a device that generates power according to light receiving. The solar cell 110 outputs the generated DC power. A power generating amount of the solar cell 110 changes according to the amount of insolation irradiated to the solar cell 110. In the embodiment, the solar cell 110 is an example of a distributed power source of which the output is can be controlled on the basis of an output control designated from a provider. However, the invention is not limited to the above configuration, and the storage battery 120 may be a distributed power source of which the output can be controlled on the basis of the output control designated from the provider.

The storage battery 120 is a device that accumulates power. The storage battery 120 outputs the accumulated DC power. In the embodiment, the storage battery 120 is an example of the distributed power source of which the output can be controlled on the basis of the output control designated from the provider.

The PCS 130 is an example of a power conditioning system (PCS) that converts the output power from the distributed power source. In the embodiment, the PCS 130 includes a conversion device 131 and the communication device 132.

The conversion device 131 converts the DC power from the solar cell 110 into an AC power, and converts the DC power from the storage battery 120 into an AC power. Further, the conversion device 131 converts an AC power from a power grid 10 into a DC power. The conversion device 131 is connected to a trunk power line 10L (herein, a trunk power line 10LA and a trunk power line 10LB) connected to the power grid 10 through a first distribution board 140A, and connected to both of the solar cell 110 and the storage battery 120. The trunk power line 10LA is a power line that connects the power grid 10 and the first distribution board 140A. The trunk power line 10LB is a power line that connects the first distribution board 140A and a second distribution board 140B. Further, in this embodiment, the conversion device 131 will be described about a hybrid power conditioning system that is connected to the solar cell 110 and the storage battery 120, but the power condition system may be connected to each of the solar cell 110 and the storage battery 120.

The communication device 132 is connected to the conversion device 131, receives various types of messages to the conversion device 131, and transmits various types of messages from the conversion device 131. For the communication between the communication device 132 and the conversion device 131, a protocol (for example, unique protocol) applied to the PCS 130 is used.

In the embodiment, the communication device 132 is connected to the router 200 in a wired or wireless manner. The communication device 132 is connected to the external server 400 through the router 200, and receives an output control message designating the output control of the distributed power source from the external server 400. Secondly, the communication device 132 is connected to the EMS 160 through the router 200, and communicates with the EMS 160 as for a predetermined command of a predetermined format. The predetermined format is not particularly limited, and an ECHONET Lite system, a SEP2.0 system, or a KNX system may be used for example.

As the predetermined format, a format in conformity to the ECHONET Lite system will be described for example. In such a case, the predetermined command may be roughly classified into a request command, a request response command that is a response to the request command, or an information notification command. The request command is, for example, a SET command or a GET command. The request response command is, for example, a SET response command that is a response to the SET command, and a GET response command that is a response to the GET command. The information notification command is, for example, an INF command.

The SET command is a command having a property that instructs a setting or an operation to the PCS 130. The SET response command is a command indicating that the SET command is received. The GET command is a command containing a property indicating a state of the PCS 130, and acquires the state of the PCS 130. The GET response command is a command that contains a property indicating the state of the PCS 130, and contains information requested by the GET command. The INF command is a command that contains a property indicating the state of the PCS 130, and notifies the state of the PCS 130.

The distribution board 140 is connected to the trunk power line 10L. The distribution board 140 includes the first distribution board 140A and the second distribution board 140B. The first distribution board 140A is connected to the power grid 10 through the trunk power line 10LA, and connected to the solar cell 110 and the storage battery 120 through the conversion device 131. In addition, the first distribution board 140A controls the power output from the conversion device 131 and the power supplied from the power grid 10 to make the power flow to the trunk power line 10LB. The power flowing from the trunk power line 10LB is distributed to the respective equipment (herein, the load 150 and the EMS 160) by the second distribution board 140B.

The load 150 is an device that consumes the power supplied through the power line. For example, the load 150 includes a device such as an air conditioner, a lighting device, a refrigerator, and a television. The load 150 may be a single device, or may be a plurality of devices.

The EMS 160 is a device (EMS: Energy Management System) that manages power information indicating the power in the facility 100. The power in the facility 100 indicates the power flowing into the facility 100, the power received by the facility 100, or the power supplied from the facility 100. Therefore, for example, the EMS 160 manages at least the PCS 130.

The EMS 160 may control a power generating amount of the solar cell 110, a charging amount of the storage battery 120, and a discharging amount of the storage battery 120. The EMS 160 may be configured to be integrally to the distribution board 140. The EMS 160 is a device that is connected to the network 300. The function of the EMS 160 may be provided by a cloud service through the network 300.

In the embodiment, the EMS 160 is connected to the respective equipment (for example, the communication device 132 of the PCS 130 and the load 150) through the router 200, and communicates with the respective equipment as for a predetermined command of a predetermined format.

The EMS 160 is connected to the display device 170 through the router 200, and communicates with the display device 170. The EMS 160 may communicate with the display device 170 as for a predetermined command of a predetermined format. As described above, the predetermined format is a format in conformity to the ECHONET Lite system for example.

The display device 170 displays the power information indicating the power in the facility 100. The display device 170 is, for example, a smart phone, a tablet, a digital television, or a dedicated terminal. The display device 170 is connected to the EMS 160 in a wired or wireless manner, and communicates with the EMS 160. The display device 170 may communicate with the EMS 160 as for a predetermined command of a predetermined format. The display device 170 receives data necessary for the displaying of the power information from the EMS 160.

The network 300 is a network that connects the EMS 160 and the external server 400. The network 300 may be the Internet. The network 300 may include a mobile communication network. In addition, the network 300 may be a dedicated communication line, or may be a general communication line. For example, when the output of the solar cell 110 is equal to or more than a predetermined output, a dedicated communication line is used as the network 300 so as to perform the output control more reliably.

The external server 400 is a server that is managed by the provider such as an electric power provider, a power transmission/distribution provider, or a retailer. For example, the provider designates the output control of the distributed power source. Specifically, the external server 400 transmits the output control message to instruct the output control of the distributed power source. The external server 400 may transmit a command (DR: Demand Response) that is an instruction to suppress an amount of current from the power grid 10 to the facility 100.

The output control message includes a target output control level that indicates a level of the output control of the distributed power source (herein, the solar cell 110). The target output control level is determined according to the output (hereinafter, referred to as an equipment recognition output) that is recognized as the output capability (for example, rated output) of the PCS that controls the distributed power source. The target output control level may be displayed by an absolute value (for example, ○○ kW) that is determined according to the equipment recognition output, may be displayed by a relative value (for example, reduction by ○○ kW) with respect to the equipment recognition output, or may be displayed by a controlled rate (for example, ○○%) with respect to the equipment recognition output. Further, while the description has been made by the equipment recognition output, an equipment recognition capacity [kWh] may be employed.

When the output capability of the distributed power source and the output capability of the PCS are different, the equipment recognition output is set to a small one in these output capabilities. When a plurality of PCSs is provided, the equipment recognition output is a sum of the output capabilities of the plurality of PCSs.

In the embodiment, the output control message includes calendar information that indicates a schedule of the output control of the distributed power source. In the calendar information, the schedule of the output control of the distributed power source can be set at every 30 minutes. The calendar information may include a schedule of one day, may include a schedule of one month, or may include a schedule of one year.

In the embodiment, a predetermined period of time may be determined as a maximum period of time when the output control of the distributed power source is performed. For example, the predetermined period of time may be several days in one year (days rule), or may be an accumulated time in one year (accumulated time rule). More specifically, the predetermined period of time may be 30 days in one year (30 days rule), or may be 360 hours in one year (360 hours rule). However, the predetermined period of time may be not determined (designation rule). These rules represent a type of the output control of the distributed power source according to the output control message.

(Application Scene)

By the way, the above property includes a property indicating a variable (hereinafter, variable property) that can be changed by the operation of the equipment such as a charging amount setting value and a discharging amount setting value of the storage battery. In the following, the PCS 130 will be mainly exemplified as an equipment.

Under such an assumption, a case will be considered where a second command (for example, the GET command) is transmitted after a first command (for example, the SET command) is transmitted, and the EMS 160 acquires the variable property from the PCS 130. In such a case, when the PCS 130 transmits a variable changed by the operation of the PCS 130 according to the second command, it is not possible for the EMS 160 to ascertain whether the PCS 130 is operating according to the first command transmitted by itself. Therefore, the PCS 130 is configured not to change the variable indicated by the variable property until the operation instructed by the first command is completed.

However, the variable is not changed in the process of the PCS 130. Therefore, even when the EMS 160 receives the response command to the second command, it is not possible for the EMS 160 to ascertain whether the PCS 130 is operating according to the first command.

Regarding such a problem, the following management is performed in the embodiment. The EMS 160 transmits the first command to the PCS 130 to instruct the operation of the PCS 130, and transmits the second command to the PCS 130 to request the state of the PCS 130. The PCS 130 controls the operation of the PCS 130 according to the first command. The PCS 130 transmits the response command (for example, GET response command) that has a property indicating the state of the PCS 130 according to the second command to the EMS 160. The properties of the first command and the second command include a variable property indicating a variable that is changed according to the operation of the PCS 130. The PCS 130 keeps the variable indicated by the variable property without any change until the operation instructed by the first command is completed. The PCS 130 transmits the response command containing a specific value as the variable property to specify whether the operation is performed according to the first command. The response command is the request response command that contains the SET response command and the GET response command, or the information notification command that contains the INF command.

Herein, the specific value may include a first specific value indicating that the operation instructed by the first command is completed. In other words, when the operation instructed by the first command is completed, the PCS 130 transmits the second command containing the variable property indicating the first specific value to the EMS 160. The first specific value may be different, from the value that can be indicated by the variable property contained in the first command. The first specific value may be a value associated with the operation completion, or may be zero.

The specific value may contain a second specific value indicating that the operation instructed by the first command is released by a user. When the operation instructed by the first command is released by the user, the PCS 130 transmits the second command containing the variable property indicating the second specific value to the EMS 160. The second specific value may be different to a value that can be indicated by the variable property contained in the first command. The second specific value may be a value associated with the operation release, or may be zero.

The specific value may include a third specific value indicating that the operation instructed by the first command is not operated or that the operation instructed by the first command is suspended. When the operation instructed by the first command is not operated, or when the operation instructed by the first command is suspended, the PCS 130 transmits the second command containing the variable property indicating the third specific value to the EMS 160. The third specific value may be different from a value that is indicated by the variable property contained in the first command. The third specific value may be a value associated with the operation inexecution or the operation suspension, or may be zero.

Herein, the first specific value may be a value that is different from the second specific value and the third specific value. However, the first specific value may be the same value as the second specific value and the third specific value. Similarly the second specific value may be a value different from the first specific value and the third specific value. However, the second specific value may be the same value as the first specific value and the third specific value. Similarly, the third specific value may be a value different from the first specific value and the second specific value. However, the third specific value may be the same value as the first specific value and the second specific value.

(Communication Device)

Figure 2:
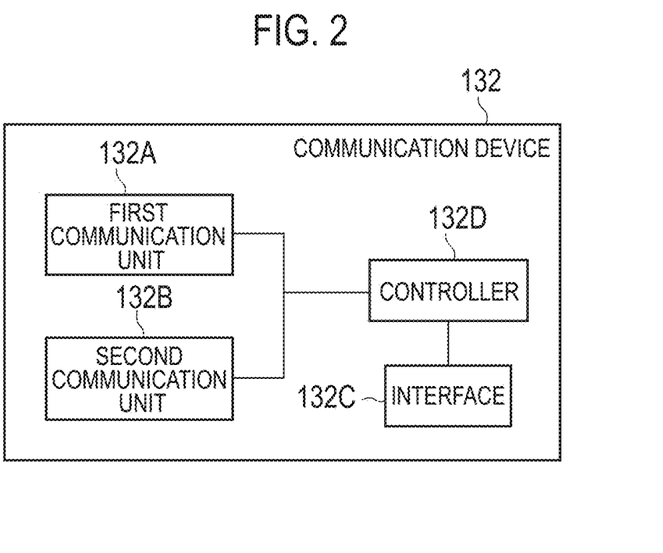
FIG. 2 is a diagram illustrating a communication device 132 according to the embodiment.

In the following, a communication device according to an embodiment will be described. As illustrated in FIG. 2, the communication device 132 includes a first communication unit 132A, a second communication unit. 132B, an interface 132C, and a controller 132D. Herein, the communication device 132 (that is, the PCS 130) is an example of the equipment.

The first communication unit 132A receives the output control message instructing the output control of the distributed power source from the external server 400. In the embodiment, the first communication unit 132A receives the output control message from the external server 400 without going through the EMS 160.

The second communication unit 132B communicates with the EMS 160 as for a predetermined command of a predetermined format. As described above, the predetermined format is a format in conformity to the ECHONET Lite system for example. Herein, the predetermined format used in the communication between the communication device 132 (the second communication unit 132B) and the EMS 160 may be different from the format used in the communication between the communication device 132 (the first communication unit 132A) and the external server 400. In addition, the predetermined format used in the communication between the second communication unit 132B (the second communication unit 132B) and the EMS 160 may be different from the format used in the communication between the communication device 132 (the interface 132C) and the conversion device 131.

The interface 132C is an interface with respect to the conversion device 131. The interface 132C may be a wired interface, or may be a wireless interface. For the communication between the communication device 132 and the conversion device 131, a protocol (for example, unique protocol) applied to the PCS 130 is used.

The controller 132D is configured by a memory and a CPU, and controls the communication device 132. For example, the controller 132D controls the conversion device 131 using the interface 132C so as to control the distributed power source according to the output control message. The controller 132D acquires the state (for example, a power generating amount of the solar cell 110, a charging amount of the storage battery 120, and a discharging amount of the storage battery 120) of the conversion device 131 from the conversion device 131 using the interface 132C. The controller 132D generates a command to control the conversion device 131 on the basis of the command received from the EMS 160, and outputs the command to the conversion device 131 using the interface 132C.

(Management Device)

Figure 3:
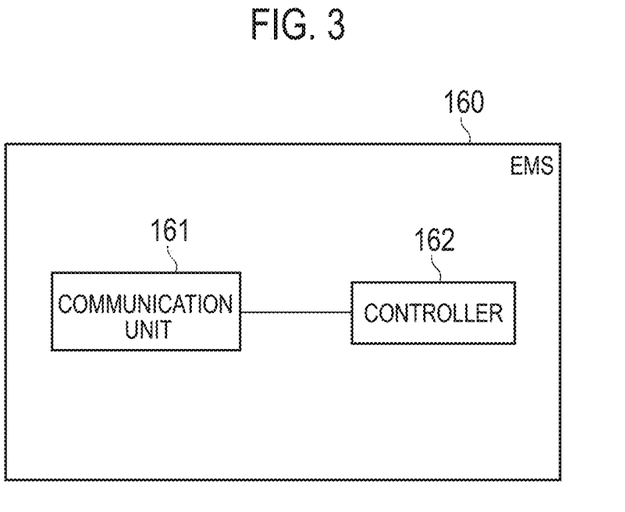
FIG. 3 is a diagram illustrating an EMS 160 according to the embodiment.

In the following, a management device according to an embodiment will be described. As illustrated in FIG. 3, the EMS 160 includes a communication unit 161 and a controller 162.

The communication unit 161 communicates with the communication device 132 as for a predetermined command of a predetermined format. As described above, the predetermined format is a format in conformity to the ECHONET Lite system for example.

The controller 162 is configured by a memory and a CPU, and controls the EMS 160. The controller 162 may control the power generating amount of the solar cell 110, a charging amount of the storage battery 120, and a discharging amount of the storage battery 120.

(Message Format)

In the following, a message format according to an embodiment will be described. Herein, the description will be given about a case where the predetermined format, is a format in conformity to the ECHONET Lite system.

Figure 4:
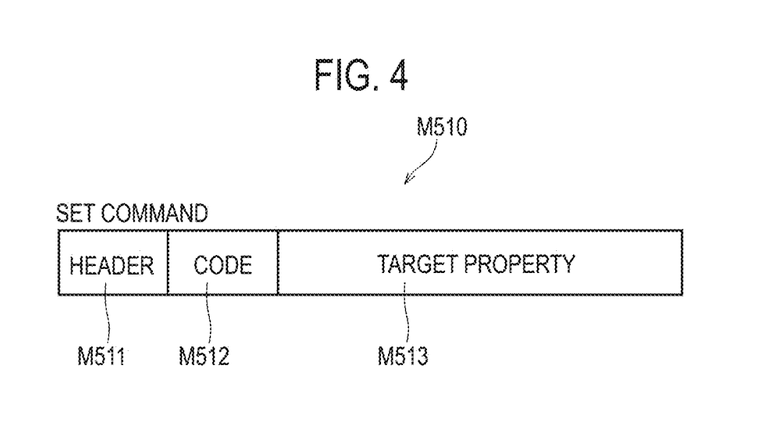
FIG. 4 is a diagram illustrating an example of a SET command according to the embodiment.

As illustrated in FIG. 4, a SET command M510 includes a header M511, a code M512, and a target property M513.

In the embodiment, the SET command M510 is an example of the first command to instruct the operation of the PCS 130, and is a command transmitted from the EMS 160 to the PCS 130.

The header M511 is information indicating a destination of the SET command M510. The code M512 is information indicating a type of the message containing the code M512. Herein, the code M512 is information indicating that the message containing the code M512 is a SET command.

The target property M513 contains a property indicating an operation that is instructed to the PCS 130 by the EMS 160. Such a property includes a variable property indicating a variable that is changed according to the operation of the PCS 130 for example. As the variable property, there is a setting value property that indicates a setting value of the charging/discharging amount of the storage battery 120. The setting value of the charging/discharging amount collectively refers to as the setting value of the charging amount or the setting value of the discharging amount. The setting value of the charging/discharging amount may be either one of these two values or may be both of these two values. The setting value of the charging amount and the setting value of the discharging amount may contain information containing a type of power. The type of power is an alternating current (AC) or a direct current (DC).

The setting value property may be a property that designates a watt hour (Wh) of the charging or the discharging for example, or may be a property that designates a capacity (Ah) of the charging or the discharging. Further, the setting value designated by the setting value property may be an instantaneous power (W) of the charging or the discharging.

Figure 5:
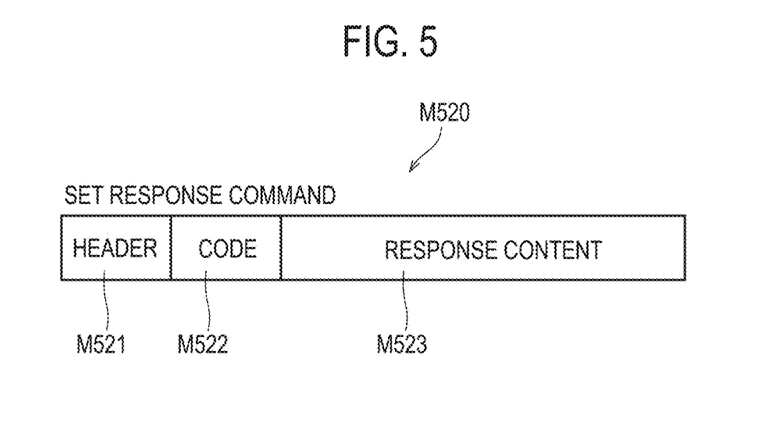
FIG. 5 is a diagram illustrating an example of a SET response command according to the embodiment.

As illustrated in FIG. 5, a SET response command M520 includes a header M521, a code M522, and a response content M523. In the embodiment, the SET response command M520 is an example of the command transmitted from the PCS 130 to the EMS 160 according to the command received from the EMS 160.

The header M521 is information indicating a destination of the SET response command M520. The code M522 is information indicating a type of the message containing the code M522. Herein, the code M522 is information indicating that the message containing the code M522 is a SET response command. The response content M523 includes information indicating that the SET command is received. Such information may be a copy of the property contained in the SET command, or may be an acknowledgement (ACK). In addition, such information is not limited, and may be a response (Selective ACK) intending that only some data is correctly received.

Figure 6:
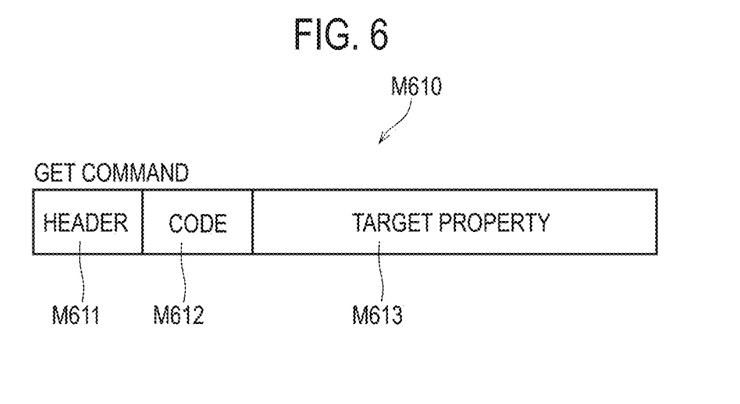
FIG. 6 is a diagram illustrating an example of the SET command according to the embodiment.

As illustrated in FIG. 6, a GET command M610 includes a header M611, a code M612, and a target property M613. In the embodiment, the GET command M610 is an example of the second command to request the state of the PCS 130, and an example of the command transmitted from the EMS 160 to the PCS 130.

The header M611 is information indicating a destination of the GET command M610. The code M612 is information indicating a type of the message containing the code M612. Herein, the code M612 is information indicating that the message containing the code M612 is the GET command. The target property M613 includes a property that the EMS 160 needs to know. Such a property includes the variable property similarly to the SET command for example. As the variable property, there is a setting value property that indicates a setting value of the charging/discharging amount of the storage battery 120 similarly to the SET command.

Figure 7:
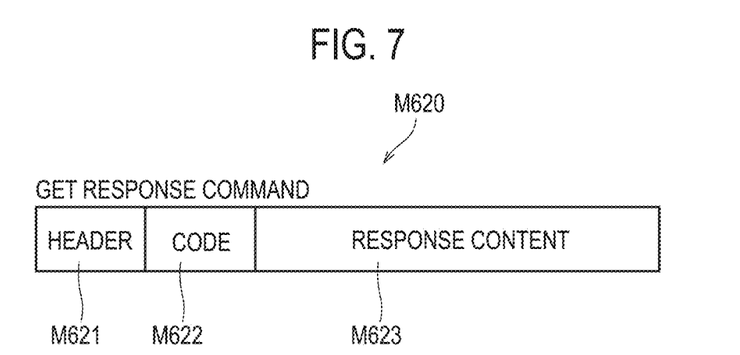
FIG. 7 is a diagram illustrating an example of the SET response command according to the embodiment.

As illustrated in FIG. 7, a GET response command M620 includes a header M621, a code M622, and a response content M623. In the embodiment, the GET response command M620 is an example of the command transmitted from the PCS 130 to the EMS 160 according to the command received from the EMS 160.

The header M621 is information indicating a destination of the GET response command M620. The code M622 is information indicating a type of the message containing the code M622. Herein, the code M622 is information indicating that the message containing the code M622 is the GET response command. The response content M623 includes a property that is requested by the GET command. Such a property includes the variable property similarly to the SET command and the GET command for example. As the variable property, similarly to the SET command and the GET command, there is a setting value property that indicates a setting value of the charging/discharging amount of the storage battery 120.

Herein, as described above, the GET response command includes a specific value as the variable property to specify whether the operation is performed according to the SET command.

(Management Method)

In the following, a management method according to the embodiment will be described. Herein, the description will be given about a case where the predetermined format used in the communication between the PCS 130 (the communication device 132) and the EMS 160 is a format in conformity to the ECHONET Lite system. A case where the SET command and the GET command contain the setting value property will be described.

Figure 8:
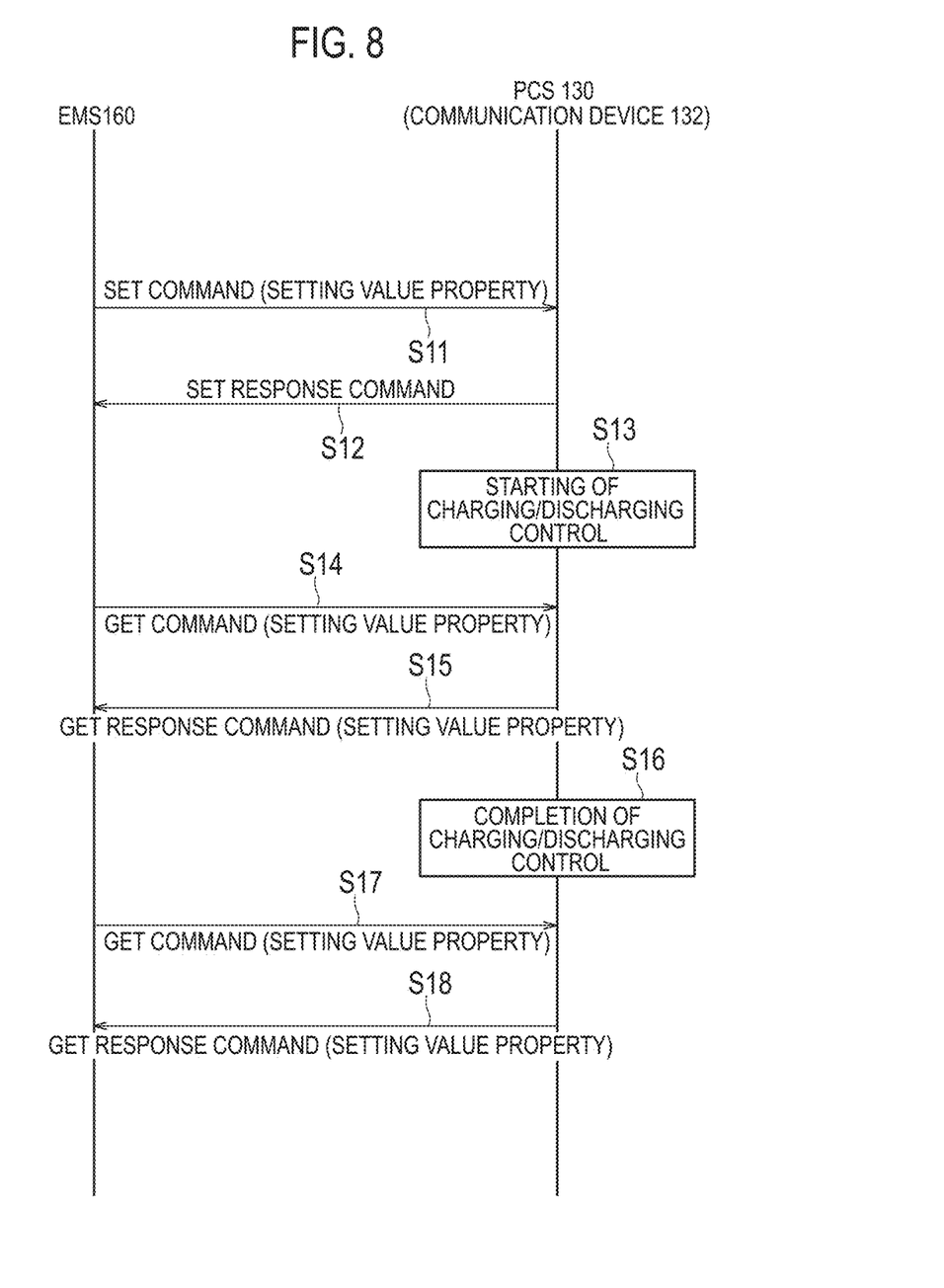
FIG. 8 is a sequence diagram illustrating a management method according to the embodiment.

First, the description will be given about a case where the PCS 130 starts the operation instructed by the SET command, and the PCS 130 completes the operation instructed by the SET command with reference to FIG. 8.

In Step S11, the EMS 160 transmits the SET command containing the setting value property to the PCS 130.

In Step S12, the PCS 130 transmits the SET response command with respect to the SET command to the EMS 160.

In Step S13, the PCS 130 starts the operation instructed by the SET command. Herein, the SET command contains the setting value property, and the PCS 130 starts the control of the charging/discharging of the storage battery 120. For example, when the setting value property is a property to instruct the charging amount, the PCS 130 starts the charging of the storage battery 120. On the other hand, when the setting value property is a property to instruct the discharging amount, the PCS 130 starts the discharging of the storage battery 120. However, the PCS 130 keeps the variable indicated by the variable property contained in the SET command without any change until the control of the charging/discharging of the storage battery 120 instructed by the SET command is completed.

In Step S14, the EMS 160 transmits the GET command containing the setting value property to the PCS 130.

In Step S15, the PCS 130 transmits the GET response command with respect to the GET command to the EMS 160. Herein, since the variable indicated by the variable property contained in the SET command is kept without any change, the PCS 130 transmits the GET response command containing a copy of the variable indicated by the SET command as the variable property. With this configuration, the EMS 160 can ascertain that the PCS 130 receives the SET command transmitted in Step S11. However, the EMS 160 hardly ascertains whether the PCS 130 is actually operated according to the SET command transmitted in Step S11.

In Step S16, the PCS 130 completes the operation instructed by the SET command. Herein, the PCS 130 completes the control of the charging/discharging of the storage battery 120. Since the control of the charging/discharging of the storage battery 120 instructed by the SET command is completed, the variable indicated by the variable property contained in the SET command may be changed by the PCS 130. Herein, the PCS 130 transitions from the control state of the charging/discharging to a standby state as the operation instructed by the SET command is completed.

In Step S17, the EMS 160 transmits the GET command containing the setting value property to the PCS 130.

In Step S18, the PCS 130 transmits the GET response command with respect to the GET command to the EMS 160. The PCS 130 transmits the GET response command containing the variable property indicating the first specific value that indicates that the operation instructed by the SET command is completed. The first specific value may be different from a value that is indicated by the variable property contained in the SET command. The first specific value may be a value associated with the operation completion, or may be zero.

Figure 9:
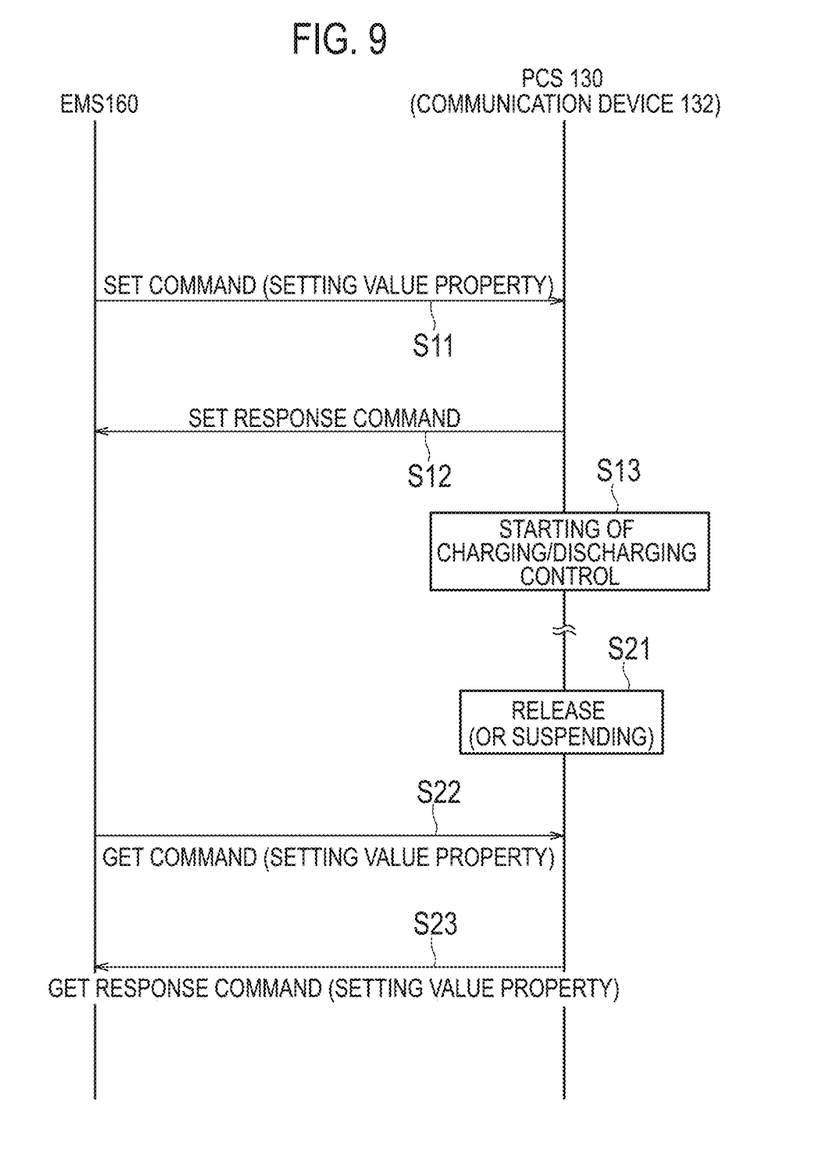
FIG. 9 is a sequence diagram illustrating a management method according to the embodiment.

Secondly, the description will be given with reference to FIG. 9 about a case where the PCS 130 starts the operation instructed by the SET command, and the operation instructed by the SET command is released or suspended. In FIG. 9, the same processes as those of FIG. 8 will be attached with the same Step symbol. The processes of Steps S11 to S13 are the same as those of FIG. 8, and the description thereof will be omitted.

In Step S21, the operation instructed by the SET command is released by the user. For example, the operation release may be an event in which the user releases the operation instructed by the SET command according to a provider's request. Alternatively, the operation instructed by the SET command is suspended. For example, the suspension of the operation may be an event in which an amount of residual charged power of the storage battery 120 is greater than a predetermined threshold when the setting value property is a property instructing the charging amount. Alternatively, the suspension of the operation may be an event in which the amount of residual charged power of the storage battery 120 is less than the threshold when the setting value property is a property instructing the discharging amount. Alternatively, the suspension of the operation may be failure or maintenance of any one of the storage battery 120 and the PCS 130. The suspension of the operation may be a blackout of the power grid 10. Alternatively, the suspension of the operation may be an event in which the operation designated by the SET command is released by the provider.

In Step S22, the EMS 160 transmits the GET command containing the setting value property to the PCS 130.

In Step S23, the PCS 130 transmits the GET response command with respect to the GET command to the EMS 160. The PCS 130 transmits the GET response command containing the variable property indicating the second specific value that indicates that the operation instructed by the SET command is released. The second specific value may be different from a value that is indicated by the variable property contained in the SET command. The second specific value may be a value associated with the operation release, or may be zero. Alternatively, the PCS 130 transmits the GET response command containing the variable property indicating the third specific value that indicates that the operation instructed by the SET command is suspended. The third specific value may be different from a value that is indicated by the variable property contained in the SET command. The third specific value may be a value associated with the operation suspension, or may be zero.

Figure 10:
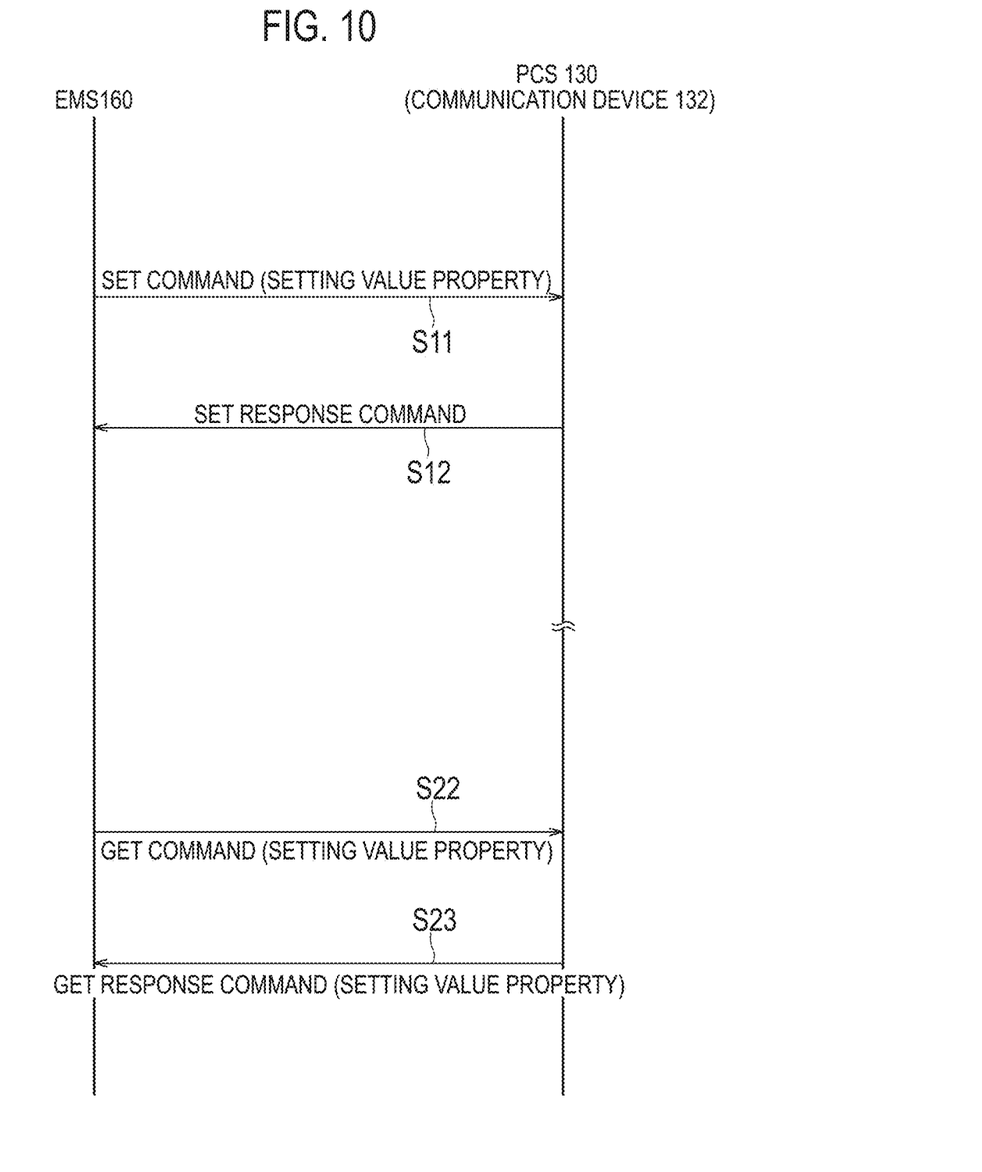
FIG. 10 is a sequence diagram illustrating a management method according to the embodiment.

Thirdly, the description will be given with reference to FIG. 10 about a case where the PCS 130 does not perform the operation instructed by the SET command. In FIG. 10, the same processes as those of FIG. 9 will be attached with the same Step symbol. The processes illustrated in FIG. 10 are the same as those of FIG. 9 except that the processes of Steps S13 and S21 are not performed.

In Step S23, the PCS 130 transmits the GET response command with respect to the GET command to the EMS 160 similarly to FIG. 9. However, in FIG. 10, the PCS 130 transmits the GET response command containing the variable property indicating the third specific value that indicates that the operation instructed by the SET command is not performed. The third specific value may be different from a value that is indicated by the variable property contained in the SET command. The third specific value may be a value associated with the operation inexecution, or may be zero.

For example, the inexeuction of the operation may be an event in which the operation designated by the SET command is restricted by the user. Alternatively, the inexeuction of the operation may be an event in which the operation designated by the SET command is restricted by the provider. Alternatively, the operation inexecution may be an event in which the operation does not start even though a predetermined period of time elapses after the SET command is received.

(Operations and Effects)

In the embodiment, when the properties of the SET command and the GET command include the variable property indicating a variable that can be changed according to the operation of the PCS 130, the PCS 130 keeps the variable indicated by the variable property without any change until the operation instructed by the SET command is completed. The PCS 130 transmits the GET response command containing a specific value as the variable property to the EMS 160 to specify whether the operation is performed according to the SET command. With this configuration, the EMS 160 can determine whether the PCS 130 is actually operated according to the SET command on the basis of the specific value contained in the GET response command. For example, the EMS 160 can determine the operation completion, the operation release, the operation suspension, or the operation inexecution.

[First Modification]

In the following, a first modification of the embodiment will be described. In the following, the first modification of the embodiment will be described.

In the first modification, the first command (that is, the SET command) can contain an operation mode property indicating an operation mode of the storage battery 120 in addition to the setting value property indicating a setting value of the charging/discharging amount of the storage battery 120. The setting value property is contained in the first command that is transmitted earlier than the first command containing the operation mode property.

In such a case, the PCS 130 controls the charging/discharging of the storage battery 120 on the basis of the operation mode property after receiving the first command containing the operation mode property without starting the charging/discharging of the storage battery 120 even when the first command containing the setting value property is received.

Figure 11:
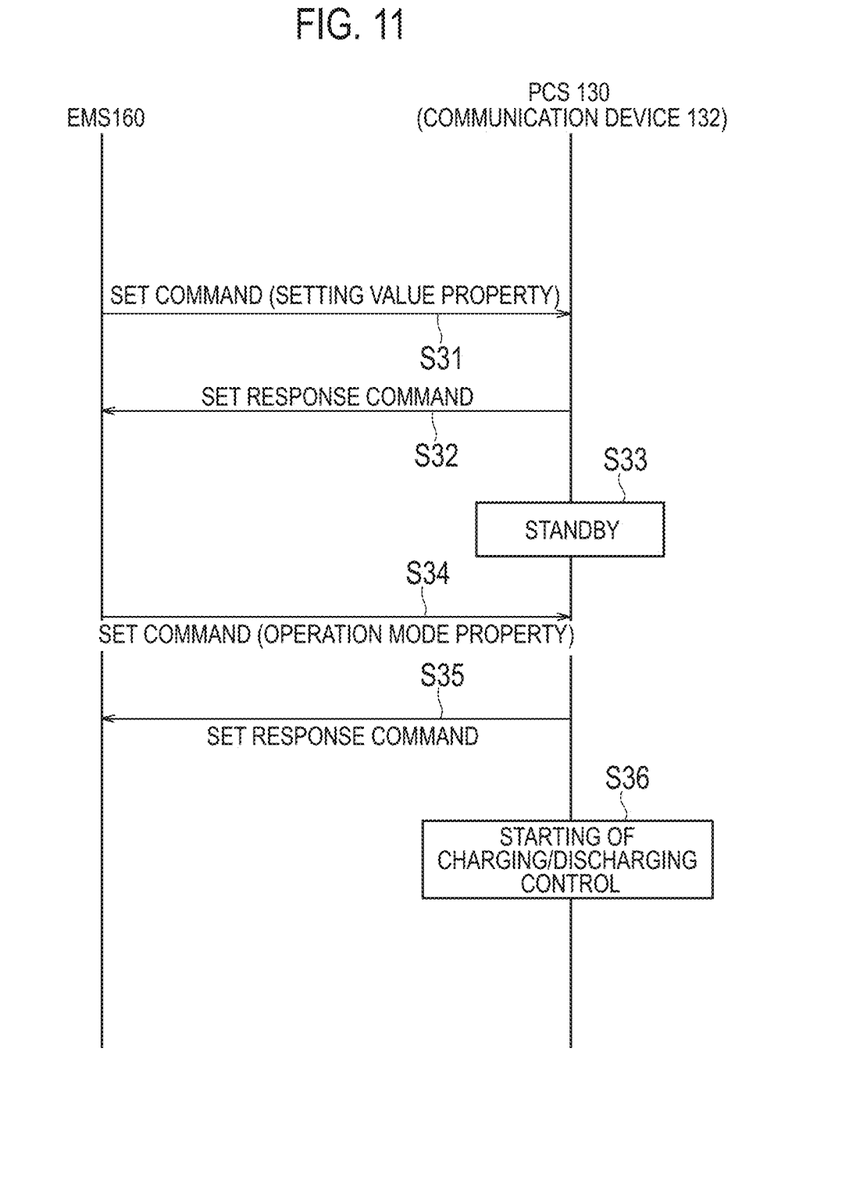
FIG. 11 is a sequence diagram illustrating a management method according to a first modification.

For example, as illustrated in FIG. 11, in Step S31, the EMS 160 transmits the SET command containing the setting value property to the PCS 130.

In Step S32, the PCS 130 transmits the SET response command with respect to the SET command to the EMS 160.

In Step S33, the PCS 130 receives the SET command containing the setting value property but is on standby without starting the charging/discharging of the storage battery 120.

In Step S34, the EMS 160 transmits the SET command containing the operation mode property to the PCS 130.

In Step S35, the PCS 130 transmits the SET response command with respect to the SET command to the EMS 160.

In Step S36, the PCS 130 controls the charging/discharging of the storage battery 120 on the basis of the operation mode property. The PCS 130 enables the setting value property received in Step S31 on the basis of the operation mode property. The enabling is to perform the charging/discharging of the storage battery 120 according to the charging/discharging amount indicated by the setting value property.

However, the PCS 130 may ignore the setting value property without enabling when the operation mode property and the setting value property are contradictable similarly to a case where the setting value property indicates the discharging amount in spite of the fact that the operation mode property indicates a charging mode.

[Second Modification]

In the following, a second modification of the embodiment will be described. In the following, the second modification of the embodiment will be described.

In the second modification, the first command (that is, the SET command) may contain the operation mode property indicating the operation mode of the storage battery 120 in addition to the setting value property indicating the setting value of the charging/discharging amount of the storage battery 120. The setting value property is contained in the first command containing the operation mode property.

Figure 12:
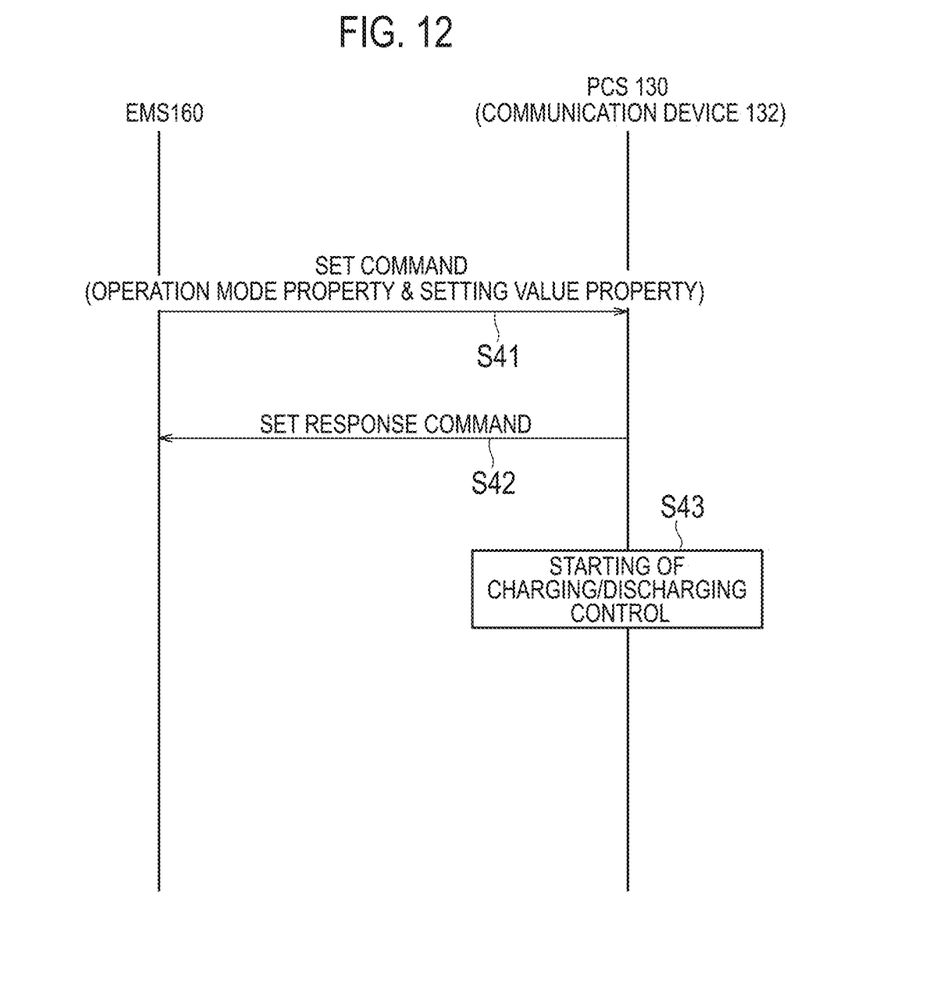
FIG. 12 is a sequence diagram illustrating a management method according to the first modification.

For example, as illustrated in FIG. 12, in Step 41, the EMS 160 transmits the SET command that contains the operation mode property and the setting value property to the PCS 130.

In Step S42, the PCS 130 transmits the SET response command with respect to the SET command to the EMS 160.

In Step S43, the PCS 130 controls the charging/discharging of the storage battery 120 on the basis of the operation mode property. Further, the PCS 130 performs the charging/discharging of the storage battery 120 according to the charging/discharging amount that is indicated by the setting value property.

However, the PCS 130 may ignore the setting value property when the operation mode property and the setting value property are contradictable similarly to a case where the setting value property indicates the discharging amount in spite of the fact that the operation mode property indicates a charging mode, and may control the charging/discharging of the storage battery 120 on the basis of the operation mode property.

Other Embodiments

The invention has been described using the above-described embodiment. However, it should be understood that the explanation and drawings representing part of the disclosure do not limit the invention. Various alternative embodiments, examples, and operating techniques may be apparent to a person skilled in the art from the disclosure.

In the embodiment, the description has been described about a case where the predetermined format used in the communication between the communication device 132 and the EMS 160 is a format in conformity to the ECHONET Lite system. However, the embodiment is not limited to such a configuration. Any format may be used as long as the predetermined format is a standard format used in the facility 100.

In the embodiment, a case where the response command is the request response command containing the GET response command has been exemplified. However, the embodiment is not limited to such a configuration. The response command may be the information notification command containing the INF command. For example, the PCS 130 may transmit the information notification command containing the variable property to the EMS 160 when a predetermined condition is satisfied. The case where the predetermined condition is satisfied may be a case where the amount of residual charged power of the storage battery 120 is greater than a predetermined threshold, or may be a case where the amount of residual charged power of the storage battery 120 is less than the predetermined threshold. Further, the case where the predetermined condition is satisfied may be a case where a value indicated by the variable property is rewritten by a third person. For example, when the SET command containing the variable property is received two times, the INF command containing the variable property may be transmitted in response to the second reception of the SET command.

In the embodiment, the PCS 130 (multi-PCS) that controls the outputs of the solar cell 110 and the storage battery 120 has been exemplified. However, the embodiment is not limited to such a configuration. The PCS 130 may be a PCS that controls the output of the storage battery 120.

In the embodiment, the PCS has been exemplified that controls the storage battery 120 as an equipment. However, the embodiment is not limited to such a configuration. The equipment may be a PCS that controls the output of the distributed power source such as the solar cell 110 and a fuel cell. The equipment may be the load 150 such as an air conditioner, a lighting device, a refrigerator, and a television. In other words, regardless of the type of the equipment, the properties of the first command and the second command may contain a variable property indicating a variable that can be changed according to the operation of the equipment.

In the embodiment, while not particularly limited, the storage battery 120 may be a storage battery provided in the facility 100, or may be a storage battery provided in an electric vehicle (EV).

In the embodiment, the communication device 132 forms part of the PCS that controls the storage battery 120, but the embodiment is not limited to the configuration. The communication device 132 may be a remote controller that is installed separately from the conversion device 131. The remote controller may be considered to form part of the PCS that controls the storage battery 120. The equipment managed by the management device (the EMS 160) may be a remote controller.

In the embodiment, the description has been given about a case where the first communication unit 132A and the second communication unit 132B are configured separately. However, the first communication unit 132A and the second communication unit 132B may be configured integrally. In other words, the first communication unit 132A may also function as the second communication unit 132B.

Further, priority is claimed on Japanese Patent Application No. 2016-66750 filed on Mar. 29, 2016, the entire content of which is incorporated herein by reference.

The invention claimed is:

1. A management system, comprising:
   a management device comprising:
      a transmitter configured to transmit a first command to an equipment to instruct an operation of the equipment, wherein a property included in the first command includes a variable property indicating a variable that can be changed by the operation of the equipment, the variable property indicating a value; and
   the equipment comprising:
      a controller configured to start the operation of the equipment instructed by the first command, and configured to keep the variable, indicated by the variable property, without change when the operation instructed by the first command is kept continuous; and
      a transmitter configured to transmit a response command to the management device, the response command containing a specific value as the variable property to specify whether the operation is performed according to the first command, wherein the specific value is different from the value indicated by the variable property contained in the first command,
   wherein
   the equipment includes a power conditioning system configured to perform charging/discharging of a storage battery,
   the variable property of the first command contains a setting value property indicating a setting value of a charging/discharging amount of the storage battery, and
   the controller is configured to control the charging/discharging of the storage battery on the basis of the setting value property contained in the first command.

2. The management system according to claim 1, wherein the transmitter provided in the equipment is configured to, in response to a condition being satisfied, transmit an information notification command as the response command, the information notification command containing the specific value as the variable property.

3. The management system according to claim 1, wherein the transmitter provided in the equipment is configured to, in response to a second command requesting a state of the equipment being received from the management device, transmit a request response command as the response command, the request response command containing the specific value as the variable property.

4. The management system according to claim 1, wherein the transmitter provided in the equipment is configured to transmit a command to the management device, the command containing the variable kept without change by the controller when the operation instructed by the first command is kept continuous.

5. The management system according to claim 1, wherein the specific value includes a first specific value indicating that the operation instructed by the first command is completed.

6. The management system according to claim 1, wherein the specific value includes a second specific value indicating that the operation instructed by the first command is released by a user.

7. The management system according to claim 1, wherein the specific value includes a third specific value indicating that the operation instructed by the first command is not performed, or that the operation instructed by the first command is suspended.

8. The management system according to claim 1, wherein the specific value includes a fourth specific value indicating that the operation instructed by the first command is not completed within a predetermined period of time.

9. The management system according to claim 1, wherein the specific value includes zero.

10. The management system according to claim 1, wherein
    the transmitter of the management device is configured to transmit, after the first command, a next first command containing an operation mode property indicating an operation mode of the storage battery, and
    the controller is configured to control the charging/discharging of the storage battery on the basis of the operation mode property that is received after the setting value property is received.

11. The management system according to claim 10, wherein
    the controller is configured to enable the setting value property when charging/discharging of the storage battery is controlled on the basis of the operation mode property.

12. The management system according to claim 1, wherein
    the first command further contains an operation mode property indicating an operation mode of the storage battery.

13. A management method, comprising:
    transmitting a first command from a management device to an equipment to instruct an operation of the equipment, wherein a property included in the first command includes a variable property indicating a variable that can be changed by the operation of the equipment, the variable property indicating a value;
    starting the operation of the equipment according to the first command and keeping the variable indicated by the variable property without change when the operation instructed by the first command is kept continuous; and
    transmitting a response command from the equipment to the management device, the response command containing a specific value as the variable property to specify whether the operation is performed according to the first command, wherein the specific value is different from the value indicated by the variable property contained in the first command,
    wherein
    the equipment includes a power conditioning system performing charging/discharging of a storage battery,
    the variable property of the first command contains a setting value property indicating a setting value of a charging/discharging amount of the storage battery, and
    the method further comprises controlling the charging/discharging of the storage battery on the basis of the setting value property contained in the first command.

14. An equipment configured to be managed by a management device, the equipment comprising:
    a controller configured to start an operation of the equipment according to a first command that is received from the management device; and
    a transmitter configured to transmit a response command to the equipment, wherein a property included in the first command includes a variable property indicating a variable that can be changed by the operation of the equipment, the variable property indicating a value, the controller is configured to keep the variable indicated by the variable property without change when the operation instructed by the first command is kept continuous, the transmitter is configured to transmit the response command containing a specific value as the variable property to specify whether the operation is performed according to the first command, and the specific value is different from the value indicated by the variable property contained in the first command, wherein the equipment includes a power conditioning system configured to perform charging/discharging of a storage battery, the variable property of the first command contains a setting value property indicating a setting value of a charging/discharging amount of the storage battery, and the controller is configured to control the charging/discharging of the storage battery on the basis of the setting value property contained in the first command.

15. A management device configured to manage an equipment, the management device comprising:

a transmitter configured to transmit a first command to the equipment to instruct an operation of the equipment; and a receiver configured to receive a response command from the equipment, wherein a property included in the first command includes a variable property indicating a variable that can be changed by the operation of the equipment, the variable property indicating a value, the variable indicated by the variable property is kept without any change when the operation instructed by the first command is kept continuous, the receiver is configured to receive the response command containing a specific value as the variable property to specify whether the operation is performed according to the first command, and the specific value is different from the value indicated by the variable property contained in the first command, wherein the equipment includes a power conditioning system configured to perform charging/discharging of a storage battery, the variable property of the first command contains a setting value property indicating a setting value of a charging/discharging amount of the storage battery, and the equipment includes a controller configured to control the charging/discharging of the storage battery on the basis of the setting value property contained in the first command.

* * * * *